United States Patent [19]

Terneu et al.

[11] 4,293,326
[45] Oct. 6, 1981

[54] GLASS COATING

[75] Inventors: Robert Terneu, Thiméon; Albert Van Cauter, Charleroi, both of Belgium

[73] Assignee: BFG Glassgroup, Paris, France

[21] Appl. No.: 49,155

[22] Filed: Jun. 18, 1979

[30] Foreign Application Priority Data

Jul. 20, 1978 [GB] United Kingdom ............... 30589/78

[51] Int. Cl.³ ...................... C03C 17/245; G02B 1/10
[52] U.S. Cl. .................................. 65/60 D; 427/109; 427/166; 427/255
[58] Field of Search ............... 65/60 D; 427/166, 255, 427/229, 253, 109

[56] References Cited

U.S. PATENT DOCUMENTS

| | | | |
|---|---|---|---|
| 2,651,585 | 9/1953 | Lytle et al. | 427/110 |
| 2,953,483 | 9/1960 | Torok | 427/255 X |
| 3,632,429 | 1/1972 | Maeda et al. | 427/255 X |
| 4,123,244 | 10/1978 | Leclercq et al. | 427/255 X |

FOREIGN PATENT DOCUMENTS 702774 1/1954 United Kingdom .

OTHER PUBLICATIONS

Ghoshtagore, "Mechanism of CVD Thin Film $SnO_2$ Formation", J. Electrochem. Soc. Solid State Science and Technology, vol. 125, No. 1, Jan. 1978, pp. 110-117.

Primary Examiner—James R. Hoffman
Attorney, Agent, or Firm—Spencer & Kaye

[57] ABSTRACT

A process of coating glass with tin oxide by exposing the glass to a gaseous medium containing tin tetrachloride vapor under conditions causing formation of the oxide coating by chemical reaction and/or decomposition. The glass is moved continuously through the coating zone and in order to promote a high optical quality of the coating the gaseous medium is formed with a tin tetrachloride concentration corresponding to a partial pressure of at least $2.5 \times 10^{-3}$ atm. and contains water vapor in a concentration corresponding to a partial pressure of at least $10 \times 10^{-3}$ atm. and the gaseous medium contacts the glass face to be coated while said medium is at a temperature of at least 300° C. and such face is at a temperature above 550° C.

17 Claims, 1 Drawing Figure

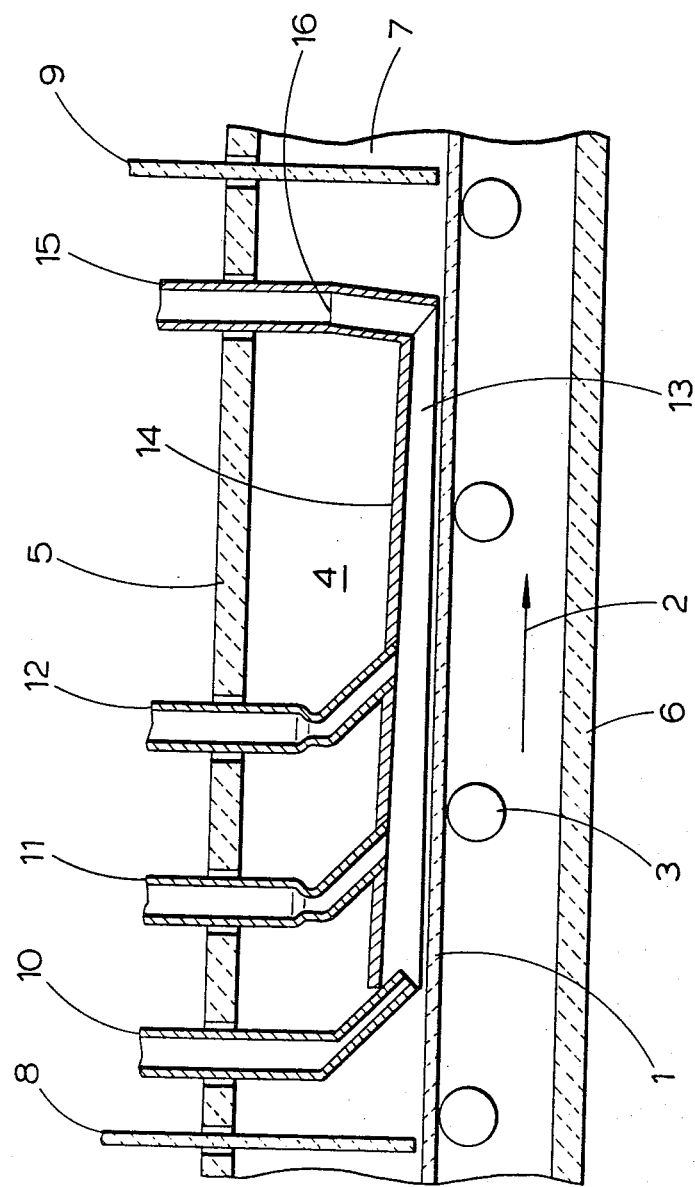

GLASS COATING

BACKGROUND OF THE INVENTION

This invention relates to a process of forming a tin oxide coating on a face of a glass substrate by contacting such face while it is at elevated temperature with a gaseous medium containing tin tetrachloride which undergoes chemical reaction and/or decomposition to form said tin oxide coating.

The vapour deposition of metal oxide films on various substrates has been described in literature, see e.g. United Kingdom patent specification No. 702,774 and "Mechanism of CVD Thin Film SnO$_2$ Formation" by R. N. Ghoshtagore in Journal of the Electrochemical Society, January 1978, page 110. These publications disclose the formation of metal oxide coatings by bringing hydrolyzable volatile chloride vapours into contact with the surface to be coated at elevated temperature and in the presence of water vapour. According to United Kingdom specification No. 702,774 a solution (which may be an aqueous solution) of an electroconductive film-forming compound e.g. stannic chloride, is sprayed onto a glass substrate at a temperature above 400° F. while water is present in the atmosphere adjacent the face being coated. The specification states that the presence of water in the atmosphere where the coating formation occurs promotes the speed of film formation but the specification stipulates that the water content of the atmosphere in which spraying takes place must in all cases be less than 0.01 pounds per pound of air. The article by R. N. Ghoshtagore in J. Electrochem. Soc. Jan. 1978 describes the vapour phase deposition of thin stannic oxide films on heated amorphous silicon dioxide substrates from a contacting mixture of stannic chloride vapour and water vapour in a carrier gas.

For various purposes it is necessary to form tin oxide coatings having very good optical properties and in particular a uniform light transmitting power, which implies a uniform structure of the coating. The difficulty of achieving coatings of high optical quality are very appreciable if the coatings have to be formed continuously on a travelling substrate such as a glass ribbon and tend to be greater as higher substrate speeds are encountered. In the flat glass manufacturing industry it is often of importance to form optical coatings on the flat glass during its continuous production and the tendency is for production speeds to increase. For example float glass is produced at ribbon speeds of at least several meters per minute and speeds up to 12 meters per minute or more are attained in some plants.

The teaching derivable from the prior publications on chemical vapour deposition techniques does not enable tin oxide coatings of high optical quality to be reliably formed at high deposition rates on a glass substrate. The formation of surface coatings by a chemical vapour deposition technique is influenced by numerous factors additional to the more obvious ones, namely the composition of the vapour and the nature of the vapour deposition reactions. Such other factors include the temperature conditions at the coating site, and the composition of the substrate face itself. Although the rate of deposition of tin oxide on a travelling substrate made of glass can be increased by performing the coating operation in a moist atmosphere, the moisture level has to be very restricted when following the teaching of the prior publications, otherwise the results are unsatisfactory. The coatings exhibit objectionable internal haze and indeed this was to be expected from the aforesaid United Kingdom specification 702,774 because the occurrance of haze is referred to in that specification as a reason why the amount of water vapour should be very restricted.

SUMMARY OF THE INVENTION

It is an object of the present invention to provide a process by which tin oxide coatings of good optical quality can be reliably formed on glass substrates by chemical vapour deposition and by which those results can be achieved at relatively high deposition rates.

According to the present invention there is provided a process of forming a tin oxide coating on a face of a glass substrate or of a previously formed coating thereon, by contacting such face while it is at elevated temperature with a gaseous medium containing tin tetrachloride which undergoes chemical reaction and/or decomposition to form said tin oxide coating, characterised in that said gaseous medium contains tin tetrachloride in a concentration corresponding to a partial pressure of at least $2.5 \times 10^{-3}$ atm. and contains water vapour in a concentration corresponding to a partial pressure of at least $10 \times 10^{-3}$ atm. and contains water vapour in a concentration corresponding to a partial pressure of at least $10 \times 10^{-3}$ atm. and is caused to contact said face while the temperature of the gaseous medium is at least 300° C. and the temperature of the glass where such contact occurs is above 550° C.

BRIEF DESCRIPTION OF THE DRAWINGS

The FIGURE shows a cross-sectional side elevation of a coating station along the path of a ribbon of glass formed by the float process.

DETAILED DESCRIPTION OF THE INVENTION

By means of the process of the present invention it is possible to achieve high tin oxide deposition rates while at the same time forming a tin oxide coating of good optical quality in terms of freedom from internal haze. The existence of the specified minimum partial pressures of tin tetrachloride and water vapour are crucial to this result. As recognised in the previously published literature hereinbefore referred to the presence of water vapour influences the tin oxide deposition rate. However under process conditions advocated prior to the present invention the water vapour tends to impair the coating quality unless used in very restricted concentrations. The present invention is based on the discovery that this strict limitation on the concentration of water vapour is not necessary provided that there is a sufficient concentration of tin tetrachloride in the gaseous medium from which the deposition of tin oxide occurs. Generally speaking an increase in the concentration of tin tetrachloride vapour over a certain concentration range itself increases the rate of tin oxide deposition, other things being equal. But the efficiency of the process in terms of the proportion of tin tetrachloride which becomes converted to tin oxide on the glass substrate and the coating quality fall off significantly if the concentration of tin tetrachloride exceeds a certain amount. By keeping the partial pressure of the water vapour at a value of at least $10 \times 10^{-3}$ atm. as above specified, high coating rates can be achieved without resorting to such high concentration of tin tetrachloride that adequate process efficiency and coating quality cannot be attained. It will be appreciated from these explanations that there is an important functional relationship between the tin tetrachloride and water vapour concentrations. By observing the specified minimum values for both of these concentrations, good optical quality coatings can be formed at higher deposition rates than is possible by applying the teaching of the prior publications in this field. The deposition rate of tin oxide as referred to in this specification is the rate of growth of the thickness of the coating of tin oxide on the substrate and can be expressed in terms of Ångstroms per second. By means of this present invention good optical quality coatings can easily be formed at deposition rates of several thousand Ångstroms per second.

In preferred processes according to the invention the gaseous medium is caused to flow along the substrate face being coated. This feature is responsible for a still further improvement in the coating quality which can be obtained.

In the most preferred embodiments of the invention the gaseous medium is caused to flow along the substrate face to be coated, as a substantially turbulence-free layer along a flow passage which is defined in part by the face of the glass and which leads to an exhaust ducting via which residual medium is drawn away from said face.

The flow of gaseous medium along the flow passage is considered substantially turbulence-free if it is substantially free of local circulating currents or vortices giving rise to a substantial increase in the flow resistance. In other words, the flow is preferably laminar but undulation of the fluid or minor eddy currents can be tolerated provided that the required metal oxide coating is formed substantially only at the boundary layer in contact with the hot substrate surface and is not to any significant extent formed as a precipitate within the fluid stream.

The avoidance of spurious deposits on the face to be coated are more easily avoided if the flow passage within which the coating is formed is shallow. Preferably the height of the flow passage measured normally to the substrate face is at no point in excess of 40 mm.

The flow passage may be of uniform height or the passage may increase or decrease in height along its length in the direction in which the gas flow takes place.

It is advantageous for the height of the flow passage to decrease in the direction of gas flow therethrough, at least over an end portion of its length leading up to the exhaust ducting. By using a flow passage which tapers in that manner it is easier to avoid objectionable turbulence within the flowing layer of gas. Preferably the flow passage tapers over at least the greater part of its length. An angle of taper of 10° or less is usually satisfactory. The foregoing features are recommended for obtaining coatings of optimum quality in terms of freedom from internal structural imperfections causing light diffusion or so called "internal haze". For promoting this same object it is of advantage for the gaseous medium flowing along the substrate face to derive at least in part from a gas stream which approaches the said faces along a path (e.g. a path leading into a said flow passage) which is at an angle of 45° or less to the substrate face. The delivery of the or a gas stream at an angle of 45° or less to the face to be coated promotes the required non-turbulent flow of gaseous medium along the flow passage.

Preferably the partial pressure of tin tetrachloride in the gaseous medium in contact with the face to be coated is from $2.5 \times 10^{-3}$ to $10^{-2}$ atm. By working in this tin tetrachloride concentration range high tin oxide deposition rates, of at least 800 Å/sec, even rates of between 2000 and 3000 Å/sec., can be achieved with high process efficiency. The minimum concentration of tin tetrachloride, within that range, which is required to achieve those results, and therefore the process efficiency, is dependent on the water vapour concentration. Very high deposition rates of at least 800 Å/sec, even e.g. between 2000 and 3000 Å/sec as above referred to can be achieved while working within the above specified tetrachloride concentration range, by maintaining a water vapour concentration corresponding with a partial pressure of between $50 \times 10^{-3}$ and $200 \times 10^{-3}$ atm.

It is preferable for the tin tetrachloride and water vapour to be supplied to the coating zone in separate gas streams so that they come into contact in the vicinity of the substrate face being coated. By this procedure premature reaction of the tin salt, causing solid deposits in the interior of a vapour feed passage can be avoided.

The tin tetrachloride vapour is preferably delivered to the substrate in a stream of nitrogen as carrier gas.

In certain very advantageous processes according to the invention a stream of nitrogen containing tin tetrachloride vapour is caused to flow along the face being coated and a stream of air containing water vapour is delivered into that stream at a position where it is in flow along the said face. A doping agent, e.g. hydrogen fluoride, can be present in the gaseous medium from which the tin oxide deposition takes place in order to increase the far infrared reflectivity of the coating. Such doping agent can, e.g., be fed to the substrate face being coated, mixed with moist air, or be fed separately.

The temperature of the glass at the coating zone can be appreciably above the specified lower limit of 550° but in accordance with common practice in the coating of glass by chemical vapour deposition techniques the temperature of the glass at the place where deposition occurs should not be so high that the glass is in soft condition.

The potential benefits of the invention are best realised when it is used for forming coatings at high deposition rates. Very important processes according to the invention are those wherein the concentrations of tin tetrachloride and water vapour in the coating zone are such that a tin oxide coating is formed at a rate of at least 800 Å/sec. Due to the high deposition rates which are attainable the invention can be employed with great advantage for forming a tin oxide coating on a ribbon of float glass as it travels from the float tank. In certain such applications of the invention a ribbon of float glass is coated with tin oxide by contacting the ribbon with a gaseous medium as hereinbefore specified, at a region along the glass ribbon path where the temperature of the glass is in the range 550° to 650° C., the glass ribbon having a speed of at least 6 m/min, and the instantaneous amounts and concentrations of tin tetrachloride and water vapour in the gaseous medium from which the tin oxide deposition takes place being such that the coating forms on the substrate at a rate of at least 800 Å/sec.

When coating a ribbon of float glass or in any other application of the present invention the coating formed by the process of the invention can be formed directly on the glass or on a previously formed coating. For example a tin oxide coating can be formed by a process according to the invention on a relatively thin undercoating of another material, which may be helpful in avoiding haze due to structural phenomena at an interface.

A process according to the invention can of course be performed repetitively to form one tin oxide coating on another.

Certain processes according to the invention will now be described, merely by way of example. In these examples reference is made to the apparatus which is shown in the accompanying diagrammatic drawing which is a cross-sectional side elevation of a coating station along the path of a ribbon of glass which has been formed by the float process.

EXAMPLE 1

The illustrated coating apparatus was used for coating a ribbon of glass 1 travelling in the direction indicated by arrow 2 from a float tank (not shown) in which the glass ribbon was formed by a float process, on a bath of molten tin. The glass ribbon had a speed of 12 meters per minute and was supported at the coating station by rollers 3.

The coating station is located in a compartment 4 of a horizontal gallery having a refractory roof 5 a refractory sole wall 6 and refractory side walls only one of which, designated 7, appears in the drawing. The ends of the compartment are formed by displaceable refractory screens 8,9. The coating apparatus is disposed at a position between the float tank and an annealing gallery. In an alternative mode, the coating apparatus could be disposed within a part of the annealing gallery.

The coating apparatus comprises three feed conduits 10,11,12 via which streams of gas can be delivered into the coating compartment. The lower end portions of these conduits are inclined downwardly and forwardly in the direction of travel of the glass ribbon, at an angle of 45° to the horizontal. The discharge ends of the conduits open into a shallow flow passage 13 defined in part by a shroud 14 and in part by the top face of the glass ribbon.

The shroud 14 extends across substantially the full width of the glass ribbon and the conduits 10,11,12 are of elongate rectangular cross section in the horizontal plane, their width (measured normally to the plane of the drawing) being only slightly less than the corresponding dimension of the shroud. The inclined discharge end portions of such conduits define slot-like discharge passageways from which the gas streams issue in the form of layers extending over substantially the full internal width of the flow passage 13.

The top of the shroud 14 is inclined slightly downwardly in the gas flow direction so that the gas flow passage 13 slightly decreases in height towards its gas exit end at which it is connected to a chimney 15. The length of the reactor, from the gas discharge end of conduit 12 to the chimney 15 is about 2 meters and its height varies from 40 mm at its entry end to 10 mm at its gas exit end. The chimney 15 is internally subdivided by partitions such as 16 into a plurality of exhaust passageways distributed in side by side relationship across substantially the whole width of the gas exhaust path.

The temperature of the glass ribbon at the region beneath the entry end of the flow passage 13 was about 580° C.

Nitrogen pre-heated to 500° C. was fed from a source (not shown) along the duct 10 so as to serve as a kind of pneumatic screen isolating the passageway 13 from the gases located in the compartment 4 and externally of the shroud 14.

Tin tetrachloride vapour entrained in a stream of nitrogen at 450° C. was fed continuously along duct 11 so as to discharge as a stream flowing along the passageway 13. The tin tetrachloride vapour was formed by spraying liquid tetrachloride into a pre-heated stream of nitrogen.

The duct 12 was continuously supplied with a gas mixture at 450° C. and comprising air, water vapour and hydrofluoric acid. The purpose of the hydrofluoric acid was to dope with fluoride ions the coating forming on the glass ribbon so as to increase the far infrared reflectivity of the coating. The supply of gas through duct 12 assists to move or press the reactive stream containing tin tetrachloride towards the surface of the glass.

As a result of the continuous delivery of gas streams as above described into the passage 13 there was maintained in the downstream end portion of this passage, between the discharge end of duct 12 and the chimney 15, a gas stream containing tin tetrachloride and water vapour (together with hydrofluoric acid). This gas mixture forms a substantially turbulence-free layer. The relative quantities of the different gases feeding into the passage 13 from the ducts 10, 11, 12 per unit time were such as to maintain in the passage 13, at the level of the glass, after the slot-like discharge orifice of duct 12, a tin tetrachloride partial pressure of $5 \times 10^{-3}$ atm and a water vapour partial pressure of $125 \times 10^{-3}$ atm. Tin oxide became deposited onto the travelling glass ribbon from that downstream end portion of the passage 13. Surplus gases were continuously exhausted from the coating site via the chimney 15.

A coating of tin oxide 8000 Å in thickness formed on the travelling glass ribbon. This corresponded with a deposition rate of 1200 Å second. Examination of the formed coating showed it to be free from internal haze notwithstanding the high rate of tin oxide deposition.

EXAMPLE 2

Using a coating apparatus as described in Example 1, coating operations were performed while maintaining partial pressures of $SnCl_4$ and $H_2O$ as indicated in the following table which also shows the corresponding deposition rates of the tin oxide coating:

| Partial pressure of $SnCl_4$ (atm) | Partial pressure of $H_2O$ (atm) | Deposition Rate (Å/sec) |
| --- | --- | --- |
| $2 \times 10^{-3}$ | $10 \times 10^{-3}$ | 400 |
| $6 \times 10^{-3}$ | $10 \times 10^{-3}$ | 560 |
| $6 \times 10^{-3}$ | $55 \times 10^{-3}$ | 1100 |
| $10 \times 10^{-3}$ | $160 \times 10^{-3}$ | 2500 |

As is apparent from this table the last two sets of conditions are the most satisfactory for obtaining high deposition rates. They are examples of the preferred processes according to the invention.

By way of modification, a part of the shroud 14 which covers the reaction zone between the discharge end of duct 12 and the chimney 15 can be constituted by a sintered metal plate and dry air can be delivered through this plate in such manner as to form an air cushion which isolates the reactive gas stream from the wall of the reactor and prevents it from becoming fouled.

In the foregoing examples the invention is carried out by causing the reactive gaseous medium to flow along the substrate face being coated. This procedure, although preferred is not essential. For example tin tetrachloride vapour and water vapour and hydrofluoric acid can be blown in separate streams towards the glass ribbon and so as to mix in a zone in which they make contact with the glass and from which surplus gases, including reaction products, are withdrawn in a direction away from the glass ribbon.

What is claimed is:

1. A process for forming a tin oxide coating on a face of a glass substrate or of a previously formed coating thereon, comprising contacting said face, while said face is at elevated temperature, with a gaseous medium containing tin tetrachloride which undergoes chemical reaction and/or decomposition to form said tin oxide coating, wherein said gaseous medium contains tin tetrachloride in a concentration corresponding to a partial pressure of at least $2.5 \times 10^{-3}$ atm. and contains water vapour in a concentration corresponding to a partial pressure of between $50 \times 10^{-3}$ and $200 \times 10^{-3}$ atm. and is caused to contact said face while the temperature of the gaseous medium is at least 300° C. and the temperature of the glass where said contact occurs is above 550° C.

2. A process according to claim 1, wherein the gaseous medium is caused to flow along the substrate face being coated.

3. A process according to claim 2, wherein the gaseous medium is caused to flow along the substrate face being coated, as a substantially turbulence-free layer along a flow passage which is defined in part by the face of the glass and which leads to an exhaust ducting via which residual medium is drawn away from said face.

4. A process according to claim 3, wherein the height of said flow passage is at no point in excess of 40 mm, said flow passage being measured normally to said substrate face.

5. A process according to claim 3 or 4, wherein the height of said flow passage decreases in the gas flow direction, at least over an end portion of the length of said flow passage leading up to the exhaust ducting.

6. A process according to claim 3 or 4, wherein at least over the greater part of the length of said flow passage, said flow passage tapers in the direction of gas flow therethrough, its angle of taper being 10° or less.

7. A process according to any of claims 2 to 4, wherein the gaseous medium flowing along the substrate face derives at least in part from a gas stream which approaches said face along a path which is at an angle of 45° or less to the substrate face.

8. A process according to any of claims 1 to 4 wherein the partial pressure of tin tetrachloride in the gaseous medium in contact with the face being coated is from $2.5 \times 10^{-3}$ to $10^{-2}$ atm.

9. A process according to any of claims 1 to 4 wherein the tin tetrachloride and water vapour are supplied to the coating zone in separate gas streams so that they come into contact in the vicinity of the substrate face being coated.

10. A process according to any of claims 1 to 4 wherein the tin tetrachloride vapour is delivered to the glass substrate in a stream of nitrogen as carrier gas.

11. A process according to claim 10, wherein a stream of nitrogen containing tin tetrachloride vapour is caused to flow along the face being coated and a stream of air containing water vapour is delivered into said stream of nitrogen at a position where the stream of nitrogen is in flow along the said face.

12. A process according to any of claims 1 to 4 wherein a doping agent mixed with moist air is fed to the substrate face being coated.

13. A process according to any of claims 1 to 4 wherein the concentrations of tin tetrachloride and water vapour in the coating zone are such that a tin oxide coating is formed at a rate of at least 800 Å/sec.

14. A process according to any of claims 1 to 4, wherein the glass substrate is a ribbon of float glass travelling from a float tank.

15. A process according to claim 14, wherein the ribbon of float glass is contacted with the gaseous medium at a region along the glass ribbon path where the temperature of the glass is in the range 550° to 650° C., the glass ribbon having a speed of at least 6 m/min, and the instantaneous amounts and concentrations of tin tetrachloride and water vapour in the gaseous medium from which the tin oxide deposition takes place being such that the coating forms on the substrate at a rate of at least 800 Å/sec.

16. A process according to any of claims 1 to 4, wherein the tin oxide coating is formed on a previously formed relatively thin coating of another material on the glass substrate.

17. A process according to claim 1 wherein said gaseous medium contains tin tetrachloride in a concentration corresponding to a partial pressure of at least $5 \times 10^{-3}$ atm.

* * * * *